United States Patent
Shin et al.

(10) Patent No.: US 8,005,366 B2
(45) Date of Patent: Aug. 23, 2011

(54) RECONNECTION METHOD IN PERIPHERAL INTERFACE USING VISIBLE LIGHT COMMUNICATION

(75) Inventors: Hong-Seok Shin, Suwon-si (KR); Dae-Kwang Jung, Suwon-si (KR); Jeong-Seok Choi, Yongin-si (KR); Kyung-Woo Lee, Yongin-si (KR); Dong-Jae Shin, Seoul (KR); Sung-Bum Park, Suwon-si (KR); Yoo-Jeong Hyun, Seongnam-si (KR); Seong Hoon Hyun, legal representative, Sung Nam (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 635 days.

(21) Appl. No.: 12/217,682

(22) Filed: Jul. 8, 2008

(65) Prior Publication Data

US 2009/0196622 A1 Aug. 6, 2009

(30) Foreign Application Priority Data

Jul. 9, 2007 (KR) ........................ 10-2007-0068621

(51) Int. Cl.
*H04B 10/00* (2006.01)
(52) U.S. Cl. ......... 398/129; 398/131; 398/156; 398/172
(58) Field of Classification Search .................. 398/156, 398/172, 118–131
See application file for complete search history.

(56) References Cited

U.S. PATENT DOCUMENTS

| | | | | | |
|---|---|---|---|---|---|
| 5,585,952 | A | * | 12/1996 | Imai et al. | 398/103 |
| 6,061,728 | A | * | 5/2000 | Mead et al. | 709/227 |
| 6,208,952 | B1 | * | 3/2001 | Goertzel et al. | 709/230 |
| 6,754,451 | B1 | * | 6/2004 | Nakamura | 398/135 |
| 7,233,745 | B2 | * | 6/2007 | Loechner | 398/128 |
| 7,548,736 | B2 | * | 6/2009 | Sakai et al. | 455/151.2 |
| 7,593,642 | B2 | * | 9/2009 | Loechner | 398/128 |
| 2006/0140404 | A1 | * | 6/2006 | Oyama | 380/201 |
| 2006/0294300 | A1 | * | 12/2006 | Lubbers | 711/113 |
| 2007/0233759 | A1 | * | 10/2007 | Tomlinson et al. | 708/200 |
| 2008/0250199 | A1 | * | 10/2008 | Lubbers | 711/113 |
| 2008/0279562 | A1 | * | 11/2008 | Naoe et al. | 398/140 |
| 2009/0022496 | A1 | * | 1/2009 | Shin et al. | 398/118 |
| 2009/0028558 | A1 | * | 1/2009 | Choi et al. | 398/41 |
| 2009/0196622 | A1 | * | 8/2009 | Shin et al. | 398/118 |

* cited by examiner

*Primary Examiner* — Agustin Bello
(74) *Attorney, Agent, or Firm* — Cha & Reiter, LLC

(57) ABSTRACT

A reconnection method and device for a peripheral interface using VLC provide a protocol for when a communication link between a primary device and a secondary device is disconnected. The primary device generates an R-XID message including reconnection information and a warning indication signal indicating the disconnection. The secondary device aligns the communication link with the primary device using the warning indication signal, receives the R-XID message from the primary device by the secondary device, and transmits an R-XID response message for the R-XID message to the primary device.

14 Claims, 5 Drawing Sheets

| 7 | 6 | 5 | 4 | 3 | 2 | 1 | 0 | |
|---|---|---|---|---|---|---|---|---|
| 1 | 1 | 0 | P | 1 | 1 | 1 | 1 | R-XID command |

FIG.5

RECONNECTION METHOD IN PERIPHERAL INTERFACE USING VISIBLE LIGHT COMMUNICATION

CLAIM OF PRIORITY

This application claims the benefit under 35 U.S.C. §119(a) of a Korean Patent Application filed in the Korean Intellectual Property Office on Jul. 9, 2007 and assigned Serial No. 2007-68621, the entire disclosure of which is hereby incorporated by reference in its entirety.

BACKGROUND OF THE INVENTION

1. Field of the Invention

The present invention generally relates to a peripheral interface using Visible Light Communication (VLC). More particularly, the present invention relates to a method for reconnecting a disconnected link between peripheral devices during communications between them.

2. Description of the Related Art

The Korean Agency for Technology and Standards (KATS) has announced that traditional lighting would be replaced by Light Emitting Diode (LED) lighting by 2015 to reduce the impact traditional lighting has on the environment. Due to their high luminous efficiency and low price, LEDs are already gaining popularity in general illumination applications that had been previously dominated by fluorescence and incandescence lighting, as well as in special illumination applications for portable devices, cars, displays, traffic signals, and advertising boards, just to name a few examples. Especially white LEDs outperform incandescent lighting in luminous efficiency and some white LED products even outperform fluorescent lighting.

In addition, Radio Frequency (RF) exhaustion, as well as probable incompatibility between wireless communication technologies, increasing communication security requirements, and the advent of an ultra high-speed ubiquitous communication environment of $4^{th}$ Generation (4G) wireless technology are driving forces behind the recent increasing interest in visible light wireless communication technology that is mutually complementary to RF technology. Therefore, many companies and research institutes are conducting studies on visible light wireless communications using visible light LEDs. With regard to the delivery of information by visible light detectable to the human eye, it is known that VLC is safe, has a wide range of use bands, and offers freedom without restrictions. In addition, as the user can view the destination and direction of light, he can find out the reception range of information. Owing to the resulting reliability in terms of security and low-power consumption, VLC is applicable for use in hospitals and airplanes where Radio Frequency (RF) use is restricted, and permits providing additional information services with the aid of an electronic bulletin board. FIG. 1A illustrates the configuration of a conventional VLC communication system.

Referring to FIG. 1A, the conventional VLC communication system includes lamps 101, 102 and 103, which are typically LEDs or Laser Diodes (LDs), for serving as lights and transmitting data by visible light, and communication devices 120 and 121 that each have a VLC transceiver for transmitting and receiving data to and from the lamps 101, 102 and 103. The communication devices 120 and 121 may comprise, for example, a mobile terminal such as a Personal Digital Assistant (PDA) and a fixed terminal such as a desktop computer.

For small-size digital products, which include portable mobile devices such as hand-held phones or PDAs, digital cameras, and MPEG Audio Layer-3 (MP3) players, many studies have been conducted on a peripheral interface equipped with an Infrared Data Association (IrDA) module for communications between devices, and for related products that have been developed and commercialized. A more efficient communication system can be realized using visible light for communications between peripheral devices.

FIG. 1B illustrates a peripheral interface system using VLC. Referring to FIG. 1B, VLC communication between peripheral devices refers to communications based on visible light among peripheral devices including a communication device 130 equipped with a VLC transceiver, such as a laptop or a desktop, a portable mobile device 131 such as a hand-held phone or a PDA, a peripheral device 132 such as a printer or a scanner, and a small-size digital product such as a digital camera or an MP3 player.

In a peripheral interface communication environment such as shown in FIG. 1B, two terminals may be misaligned with each other due to a user's hand trembling or an unintended motion that has interfered with the communication link. In this case, a VLC module needs to visually notify the user of the disconnection of a communication link to enable the user to take corrective action, and a reconnection procedure is required to reconnect the communication link. If the communication link is reconnected in the same manner as an initial access process, information required for the initial access should be re-transmitted, thereby consuming resources. Accordingly, there exists a need for developing a method for enabling the user to be made visibly aware of the disconnection of the communication link as quickly as possible and for specifying a reconnection procedure for efficiently establishing a reconnection based on existing information, unlike the initial access procedure.

SUMMARY OF THE INVENTION

The present invention provides a method and system for reconnecting a disconnected communication link during peripheral device communications based on VLC. In accordance with an exemplary aspect of the present invention, there is provided a reconnection method in a peripheral interface using VLC, in which when a communication link between a primary device and a secondary device is disconnected, the primary device generates an R-XID message including reconnection information and a warning indication signal indicating the disconnection, and the secondary device aligns the communication link with the primary device using the warning indication signal, receives the R-XID message from the primary device by the secondary device, and transmits an R-XID response message for the R-XID message to the primary device.

BRIEF DESCRIPTION OF THE DRAWINGS

The above features and advantages of certain exemplary embodiments of the present invention will be more apparent from the following detailed description taken in conjunction with the accompanying drawings, in which:

FIG. 5 illustrates the structure of an Unnumbered (U) frame carrying a Re-Exchange Identification (R-XID) message during a reconnection in the peripheral interface using VLC according to an exemplary embodiment of the present invention.

Throughout the drawings, which have been provided only for illustrative purposes of a reconnection and in no way limit the invention to the examples shown and described, the same drawing reference numerals will be understood to refer to the same elements, features and structures.

DETAILED DESCRIPTION

The matters defined in the description such as a detailed construction and elements are provided to assist in a comprehensive understanding of certain exemplary embodiments of a reconnection method for peripheral devices according to the present invention. Accordingly, those of ordinary skill in the art will recognize that various changes and modifications of the exemplary embodiments described herein can be made without departing from the spirit of the invention and the scope of the appended claims. Also, descriptions of well-known functions and constructions may be omitted for clarity and conciseness when their inclusion would obscure appreciation of the subject matter of the present invention by a person of ordinary skill in the art.

Figure 1A:
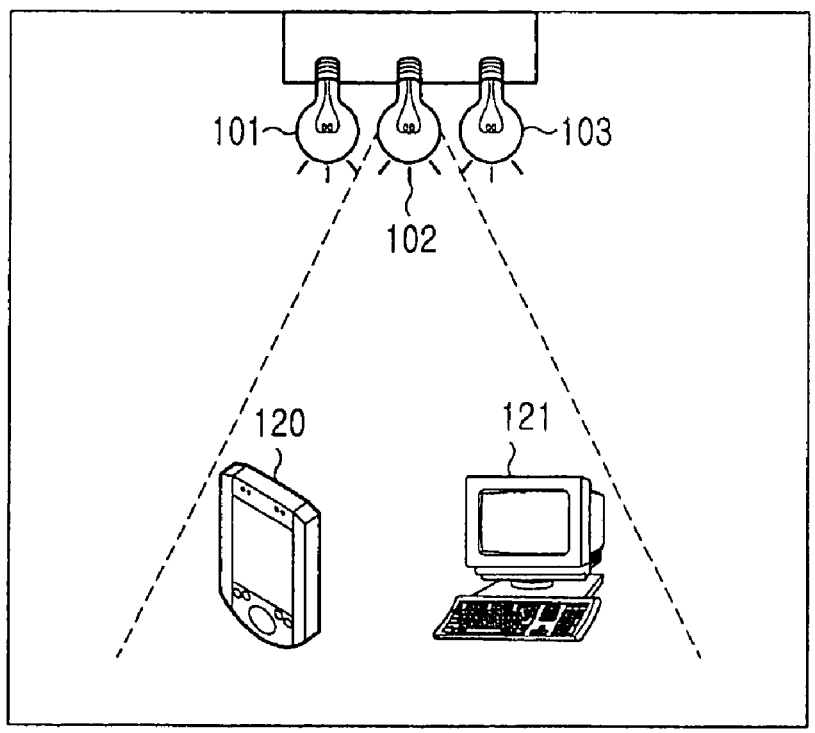
FIG. 1A illustrates the configuration of a conventional VLC communication system.
Figure 1B:
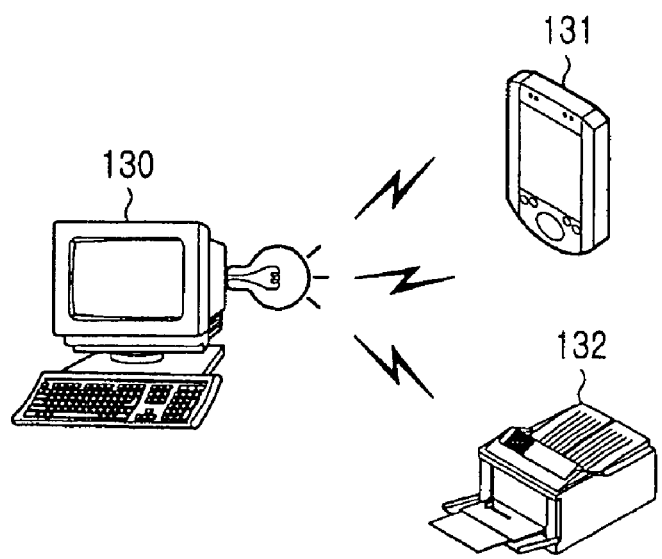
FIG. 1B illustrates a peripheral interface system using VLC.
Figure 2:
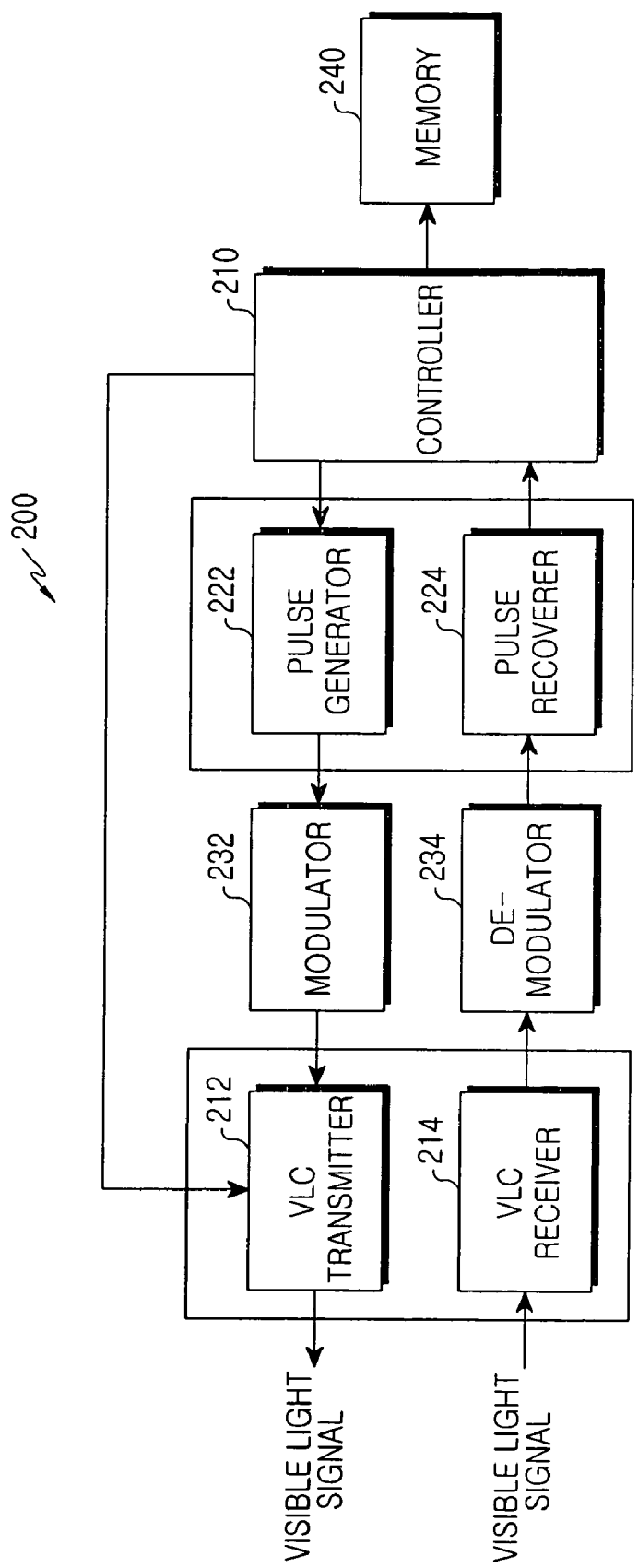
FIG. 2 is a block diagram of a VLC transceiver according to an exemplary embodiment of the present invention.

FIG. 2 is a block diagram of a VLC transceiver according to an exemplary embodiment of the present invention.

Referring to FIG. 2, a VLC transceiver 200 according to an exemplary embodiment of the present invention typically includes a controller 210, a VLC transmitter 212, a VLC receiver 214, a pulse generator 222, a pulse recoverer 224, a modulator 232, and a demodulator 234. The controller 210 provides overall control to the VLC transceiver 200. More particularly, the controller 210 controls the VLC transmitter 212 to output a visible light signal with a wavelength between 350 nm and 700 nm continuously or discontinuously during VLC transmission and reception according to the present invention. The controller 210 also stores data received by visible light in a memory 240. Still referring to FIG. 2, the pulse generator 222 generates a pulse signal corresponding to transmission data under the control of the controller 210. The modulator 232 modulates the pulse signal received from the pulse generator 222 to a signal suitable for VLC and provides it to the VLC transmitter 212.

The VLC transmitter 212 transmits a visible light signal corresponding to the modulated signal under the control of the controller 210. The VLC transmitter 212 can be configured with, for example, a Laser Diode (LD), an LED, or an LD or LED array as a light source, just to name a few possible examples.

The VLC receiver 214 converts an input visible light signal into an electrical signal for demodulating and processing. The VLC receiver 214 can be configured with a photo diode for converting incident external light to an electrical signal.

The demodulator 234 demodulates the converted electrical signal output from the VLC receiver into a pulse signal. The pulse recoverer 224 then recovers data from the pulse signal and typically provides the data to the controller 210.

For transmission from the VLC transceiver 200 to a peripheral device, for example, the pulse generator 222 generates a pulse signal corresponding to transmission data under the control of the controller 210, the modulator 232 modulates the pulse signal so as to provide a modulated signal suitable for VLC, in which VLC transmitter 212 transmits a visible light signal corresponding to the modulated signal output from modulator 232.

Figure 3:
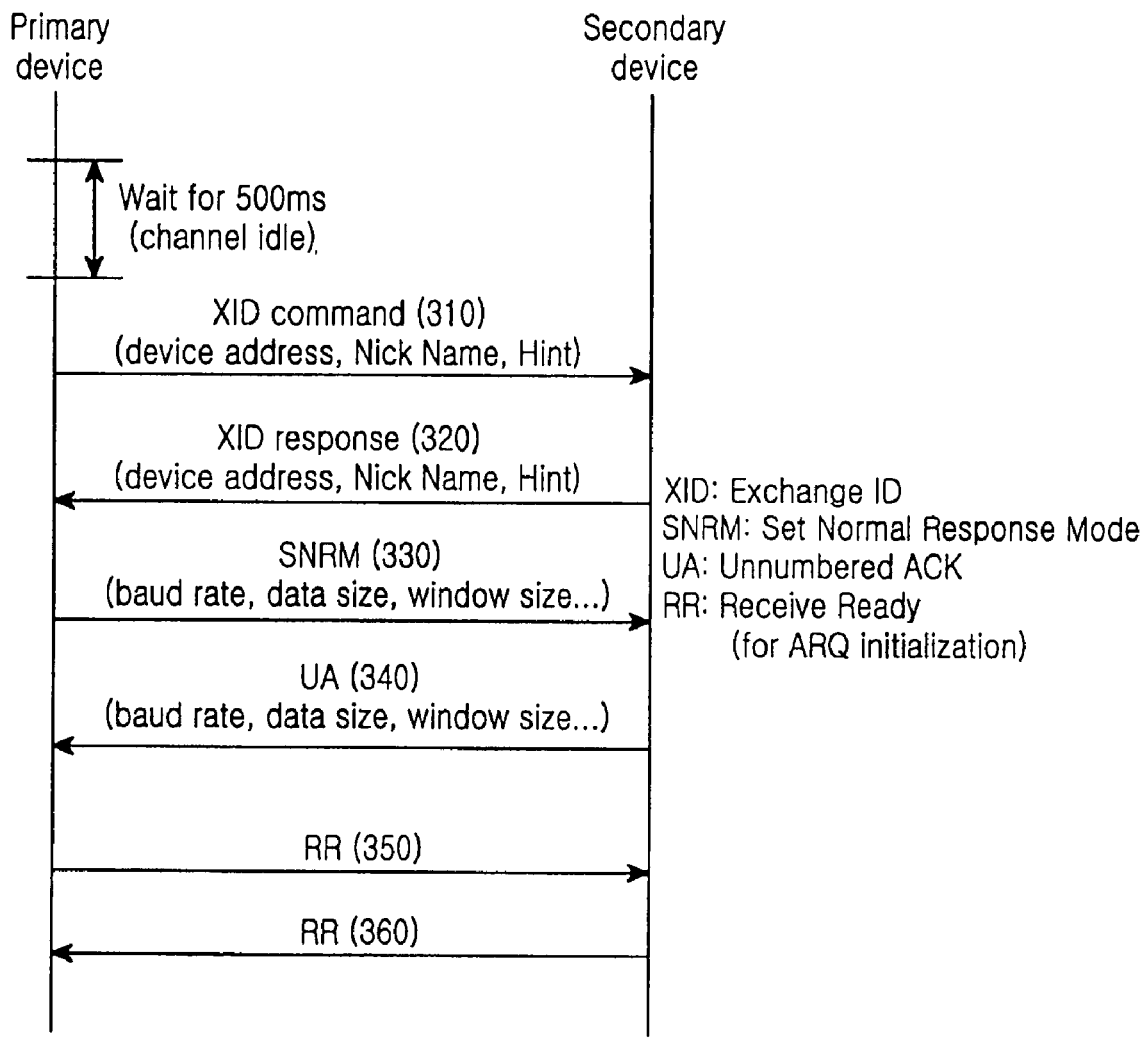
FIG. 3 is a diagram illustrating a signal flow for an initial access operation in a conventional IrDA system.

For reception in the VLC transceiver 200, the VLC receiver 214 is typically configured with a photo diode for receiving a visible light signal and converting the visible light signal to an electrical signal under the control of the controller 210. The demodulator 234 demodulates the electrical signal to a pulse signal. The pulse recoverer 224 recovers data from the pulse signal and provides the data to the controller 210. FIG. 3 is a diagram illustrating a signal flow for an initial access operation in a conventional IrDA system.

Now referring to FIG. 3, a primary device periodically generates an Exchange Identification (MD) message after communications start in step 310. The XID message includes a device address, a nickname, and a hint. A secondary device receives the XID message and acquires synchronization to the primary device. Then the secondary device replies to the primary device with an XID response message in step 320.

After succeeding in an initial access, the primary device transmits a Set Normal Response Message (SNRM) message to the secondary device in step 330. In response to the SNRM, the secondary device transmits an Unnumbered Acknowledgment (UA) message to the primary device, thus performing registration in step 340. Each of the SNRM message and the UA message includes a baud rate, a data size, and a window size.

Transmission and reception of a Receive Ready (RR) message indicating that a channel is ready between the primary and secondary devices in steps 350 and 360 are optional. After the RR message transmission and reception, data is transmitted between the primary and secondary devices.

Peripheral interfacing using VLC according to an exemplary embodiment of the present invention refers to communications between peripheral devices equipped with the VLC transceiver illustrated in FIG. 2, for transmitting and receiving data by VLC.

An exemplary embodiment of the present invention proposes a reconnection procedure in the VLC-based peripheral interface, for reconnecting a communication link between primary and secondary devices when the communication link is disconnected due to any of a plurality of reasons, including but not limited to a user's hand trembling or unintended motion during communications.

The reconnection procedure includes re-transmission requesting, disconnection warning and reconnection requesting, and reconnection responding. The reconnection responding can be replaced by initial connection responding used for an initial access.

Figure 4:
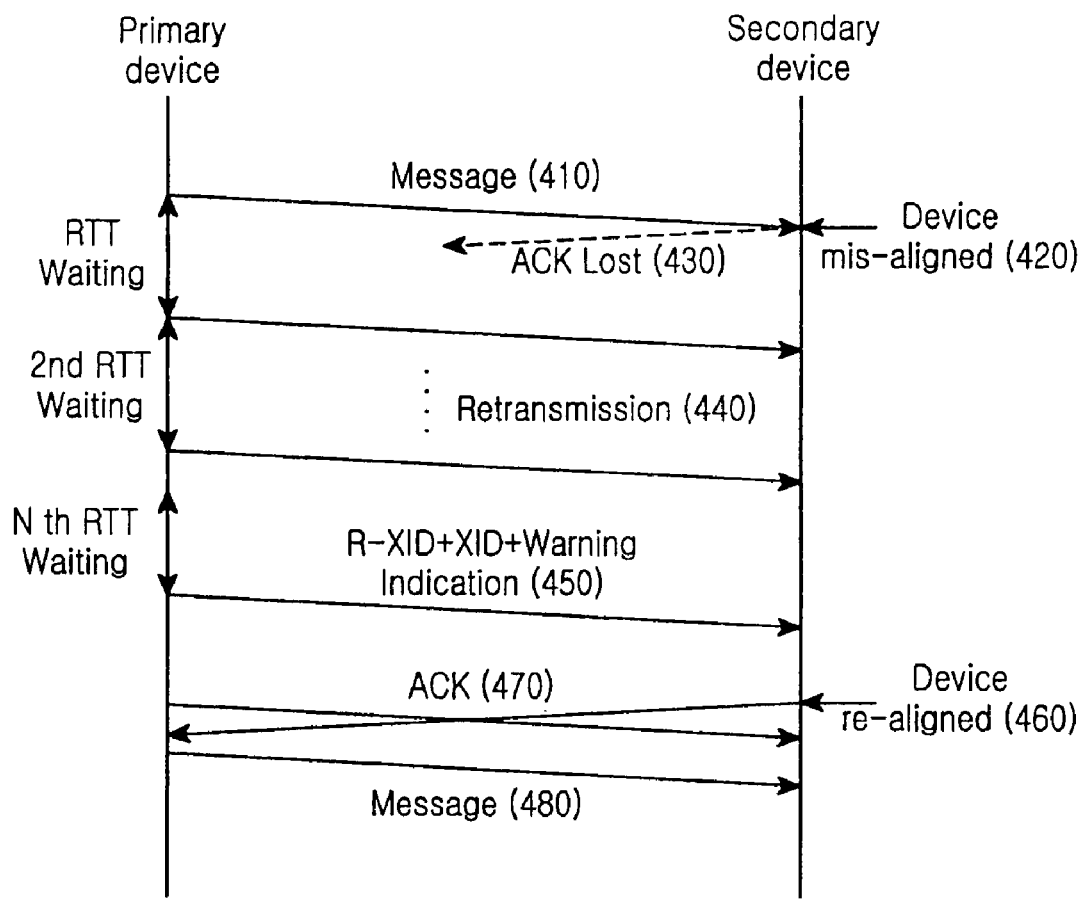
FIG. 4 is a diagram illustrating a signal flow for a reconnection operation in a peripheral interface using VLC according to an exemplary embodiment of the present invention.

FIG. 4 is a diagram illustrating a signal flow for a reconnection operation in a peripheral interface using VLC according to an exemplary embodiment of the present invention.

Referring to FIG. 4, when an ACK signal is lost in step 430 due to a link misalignment between a transmitter and a receiver during data communications between primary and secondary devices in step 420, the primary device retransmits a message after a Round Trip Time (RTT) in step 440. If the primary device fails to receive an ACK message after a predetermined number of (N) retransmissions, it determines that the communication link between the primary and secondary devices has been disconnected. It should be noted that N could be any number from zero upward.

In step 450, the primary device transmits a disconnection warning indication message to the secondary device so that the user is aware of the disconnection. The disconnection warning indication message includes an R-XID message, an XID message, and a warning indication signal. If the secondary device is out of alignment with the primary device, the disconnection warning sent to the secondary device may not be received.

The R-XID message requests a reconnection to the other party with which communications have been conducted. It still uses an existing connection ID, an existing source address, an existing destination address, and a request for the number of the last received message.

The XID message is used in case that a new device other than the existing communication party is connected. XID response transmission and reception and the subsequent procedure are performed in the same manner as in the initial access procedure.

The warning indication signal, which is not used in known 10B encoding formats, serves the purpose of making the user visibly aware of the disconnection. The warning indication signal includes a first 10-bit signal with a higher ratio of LED-on for a predetermined time and a second 10-bit signal with a higher ratio of LED-off for the predetermined time. These two 10-bit signals alternate in the warning indication signal. For example, if the first 10-bit signal is '1111011111', the second 10-bit signal is '0000100000', and the cycle of each 10-bit signal is 0.1 second, the disconnection warning indication message will be a repetition of [R-XID+XID+ '1111011111' for 0.1 second and '0000100000' for 0.1 second].

The secondary device is aware from the warning indication signal that the communication link has been disconnected, aligns the communication link between the primary and secondary devices, and receives the R-XID message from the primary device in step 460. Then the secondary device transmits an ACK message including an R-XID response message for the disconnection warning indication message in step 470.

Compared to an XID response message, the R-XID response message in step 470, which is an ACK signal or includes an ACK, is typically transmitted in an Information (I)-frame, not in a U-frame.

Upon receipt of the R-XID response message, the primary device discontinues transmission of the disconnection warning indication message. The primary device completes the reconnection to the secondary device by receiving the R-XID response message and resumes data transmission in step 480.

Figure 5:
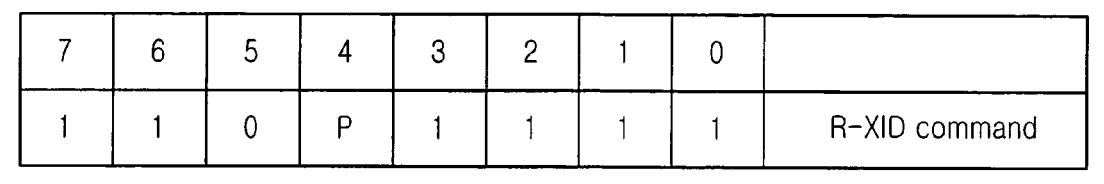

FIG. 5 illustrates the structure of a U-frame carrying an R-XID message during a reconnection in the peripheral interface using VLC according to an exemplary embodiment of the present invention. The U-frame typically has a control field with 1- or 2-byte segments for flow management. An exemplary control field for the U-frame of the R-XID message used during a reconnection according to the exemplary embodiment of the present invention is illustrated in FIG. 5. A conventional IrDA Link Access Protocol (IrLAP) defines 14 codes for the control field of the U-frame. An R-XID command used for the reconnection in the peripheral interface using VLC is one of codes unused in the conventional IrLAP. As is apparent from the above description, when a communication link between a primary device and a secondary device is disconnected in a VLC-based peripheral interface communication system, the present invention advantageously enables a user to be aware of the disconnection based on the features of VLC. Since the same information used during an initial access is still used for a reconnection, unnecessary resource consumption is reduced and the reconnection is simplified, thereby enabling a fast reconnection.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents. For example, the designations for which device is designated as a primary device and which device is designated a secondary device may be different, so long as the protocol is performed.

What is claimed is:

1. A reconnection method in a peripheral interface using Visible Light Communication (VLC), comprising:
   generating by a primary device a Re-Exchange Identification (R-XID) message including reconnection information and a warning indication signal indicating a disconnection between the primary device and a secondary device, when a communication link between a primary device and a secondary device is disconnected;
   aligning by the secondary device the communication link with the primary device according to the warning indication signal and the R-XID message received from the primary device; and
   transmitting by the secondary device to the primary device an R-XID response message in response to receipt of the R-XID message.

2. The reconnection method of claim 1, wherein the R-XID message includes a connection ID, a source address, and a destination address prior to the disconnection of the communication link between the primary device and the secondary device, and the R-XID message also includes information about a number of a last received message.

3. The reconnection method of claim 1, wherein the warning indication signal is generated in a pattern unused by 10B encoding and comprises a first 10-bit signal with a higher ratio of 1s and a second 10-bit signal with a higher ratio of 0s, wherein the first and second 10-bit signals alternate with each other every predetermined period.

4. The reconnection method of claim 1, further comprising transmitting an XID message for a new device connected to the primary device as the secondary device, when the communication link between the primary device and the secondary device is disconnected.

5. The reconnection method of claim 1, wherein the R-XID response message includes an ACKnowledgment (ACK) signal and is transmitted in an Information (I) frame.

6. The reconnection method of claim 1, further comprising the primary device discontinuing transmission of the R-XID message, the warning indication signal, and an XID message, upon receipt of the R-XID response message received from the secondary device.

7. The reconnection method of claim 1, wherein the primary and secondary devices emit visible light having a wavelength ranging from about 350 nm to 700 nm and include at least one of a Laser Diode (LD), a Light Emitting Diode (LED), an LD array, and an LED array as a light source.

8. A device for Visible Light Communication (VLC), comprising:
   a controller for overall control of a device, said device comprising a transmission side and a receiving side;
   said transmission side including:
   a VLC transmitter for transmitting a visible light signal;
   a pulse generator for generating a pulse signal corresponding to transmission data under the control of the controller;
   a modulator for modulating the pulse signal received from the pulse generator into a signal suitable for VLC and for outputting the modulated signal to the VLC transmitter; and said receiver side including:
- a VLC receiver for receiving a visible light signal and converting the visible light signal into an electrical signal under the control of the controller;
- a demodulator for demodulating the converted electrical signal output from the VLC receiver into a pulse signal;
- a pulse recoverer for recovering data from the pulse signal output from said demodulator and for providing the data to the controller;
- wherein said controller controls the VLC transmitter and VLC receiver for communicating via a communication link with a secondary device and controlling the VLC transmitter to transmit a Re-Exchange Identification (R-XID) message including reconnection information and a warning indication signal indicating a disconnection to the secondary device after failing to receiving an Acknowledgment (ACK) message from the secondary device after a predetermined number of retransmissions of a previous message.

9. The VLC device according to claim 8, wherein the warning indication signal comprises a generated a pattern unused by 10B encoding and comprises a first 10-bit signal with a higher ratio of 1s and a second 10-bit signal with a higher ratio of 0s, wherein the first and second 10-bit signals alternate with each other every predetermined time period.

10. The VLC device according to claim 8, wherein the VLC transmitter transmits and the VLC receiver receives visible light having a wavelength ranging from about 350 nm to 700 nm, and said VLC transmitter includes at least one of a Laser Diode (LD), a Light Emitting Diode (LED), an LD array, and an LED array as a light source.

11. The VLC device according to claim 10, where the VLC receiver comprises a photodiode.

12. The VLC device according to claim 8, wherein the controller controls the VLC transmitter for discontinuing transmission of the R-XID message and the warning indication signal upon receipt of an R-XID response message received by the VLC receiver.

13. The VLC device according to claim 12, wherein the R-XID response message includes said ACKnowledgment (ACK) signal and is transmitted in an Information (I) frame.

14. The VLC device according to claim 8, wherein the R-XID message sent by the VLC transmitter includes an existing connection ID, an existing source address, an existing destination address, and a request for a number of a last received message.

* * * * *